April 2, 1929.  R. P. BROWN  1,707,624
GAS COMPARISON APPARATUS
Filed May 25, 1927
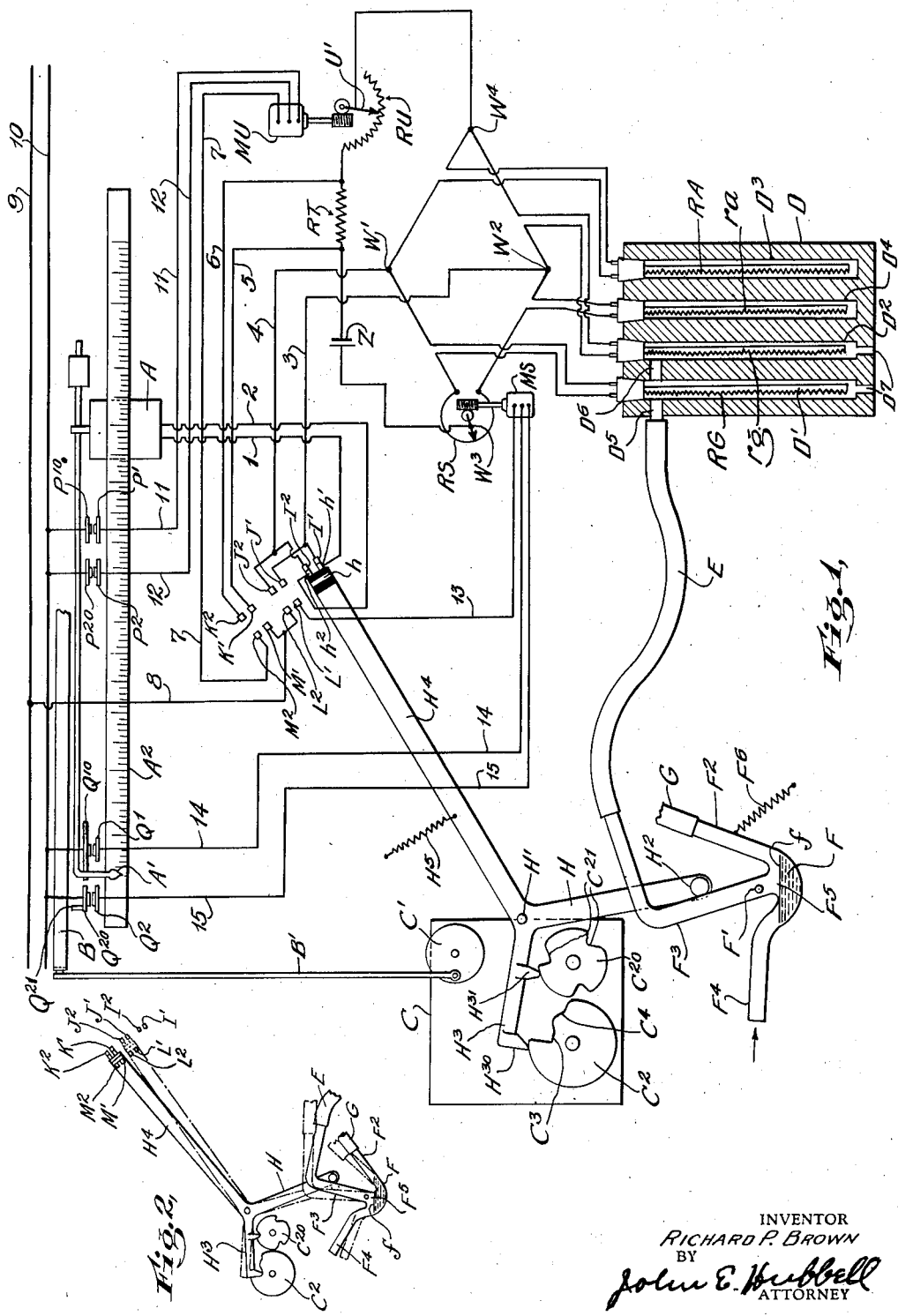
INVENTOR
RICHARD P. BROWN
BY
John E. Hubbell
ATTORNEY Patented Apr. 2, 1929.

1,707,624

UNITED STATES PATENT OFFICE.

RICHARD P. BROWN, OF PHILADELPHIA, PENNSYLVANIA, ASSIGNOR TO THE BROWN INSTRUMENT COMPANY, OF PHILADELPHIA, PENNSYLVANIA, A CORPORATION.

GAS-COMPARISON APPARATUS.

Application filed May 25, 1927. Serial No. 194,220.

The general object of my present invention is to provide improved apparatus for measuring the thermal conductivity of a fluid, and particularly for determining the composition of a gas by a known electrical method of comparing the thermal conductivity of the gas with the thermal conductivity of air or some other standard gas of known composition.

In the known method of gas analysis referred to, the thermal conductivities of the test and standard gases are compared by the use of comparison cells, one or more of which contain the test gas, and one or more of which contain the standard gas, and each of which contains a resistor through which an electric current is passed, each resistor being of such composition that its resistance depends upon its temperature. The temperature of each of said resistors depends upon the thermal conductivity of the gas in contact with it and serving to conduct from the resistor to the wall of the enclosing cell the heat imparted to the resistor by the current passing through the resistor from the latter.

In the practical use of the above described method the changes in resistor resistance resulting from the difference of composition of the gases in contact with the resistors are quite small, and the metering system must be correspondingly sensitive. In practice, however, it is necessary to connect the said resistors in the different arms of a Wheatstone bridge, or to use some analogous metering circuit arrangement to secure meter deflections of adequate extent.

In accordance with the present invention, the measuring apparatus employed in determining gas thermal conductivities in the manner previously referred to is provided with simple and effective means for automatically recalibrating the metering system at suitable intervals as by re-balancing the bridge, and by adjusting a resistance to compensate for variations in the voltage of the battery by which the bridge is energized.

The various features of novelty which characterize my invention are pointed out with particularity in the claims annexed to and forming a part of this specification. For a better understanding of the invention, however, and the advantages possessed by it, reference should be had to the accompanying drawings and descriptive matter in which I have illustrated and described a preferred embodiment of the invention.

Of the drawings:—

Fig. 1 is a diagram illustrating a measuring system; and

Fig. 2 is a view showing a portion of the apparatus of Fig. 1 with parts in different relative positions.

In the diagrammatically illustrated embodiment of the invention shown in the drawings, A represents the movable element of a galvanometer having a pointer A' swinging along a scale $A^2$ and periodically engaged and depressed by a depressor B. As shown, the depressor B is actuated by a device C which ordinarily is an electric clock motor or analogous timing device. In practice, the periodical impressions of the pointer A' may well cause the latter to make a record on a travelling record chart, but as the invention may be used in connection with an indicating meter as well as with a recording meter, and inasmuch as all those skilled in the art will understand how the periodical pointer depressions may be employed to make a record on a travelling chart, it seems neither necessary nor desirable to complicate the disclosure herein by illustrating a record chart and the means for giving said chart its movements.

In the apparatus shown in the drawings, the depression of the pointer A' serves to selectively energize certain control circuits as and for purposes hereinafter described. The galvanometer A normally has its terminals 1 and 2 connected to opposing junction points W' and $W^2$ of a Wheatstone bridge. This bridge, as shown, includes in two opposing arms resistors RG and $rg$ respectively, said resistors being located in cells D' and $D^2$ respectively, of a comparison gas cell structure D. One of the other arms of the Wheatstone bridge includes a resistor RA, and the fourth bridge arm includes a resistor $ra$. The resistors RA and $ra$ are located in separate cells $D^3$ and $D^4$ of the cell structure D. The cells $D^3$ and $D^4$ contain a standard gas as air, and are normally sealed so that the contents of the cells are not varied by changes in atmospheric conditions. The cells D' and $D^2$ normally contain the test gas supplied to the cell structure through a conduit E and ports $D^5$ and $D^6$. A continuous gas flow through the cells D' and $D^2$ is normally maintained by the usual gas exhausting means (not shown) connected to discharge ports $D^7$ leading from the lower ends of the cells $D'$ and $D^2$.

The test gas is normally supplied to the conduit E through a gas switch F from a conduit G. The gas switch F, as shown, is pivoted at $F'$ and comprises three hollow arms $F^2$, $F^3$ and $F^4$, all leading downward to a sealing liquid chamber $F^5$. The arm $F^2$ is connected at its outer end to the conduit G. The arm $F^3$ is connected at its outer end to the conduit E. The arm $F^4$ is open at its outer end to the atmosphere. The various parts of the gas switch member F are so arranged that when the apparatus is in the position shown in Fig. 1, the sealing liquid $f$ in the chamber $F^5$ permits gas to flow from the conduit G through the hollow arm $F^2$ into the chamber $F^5$ and thence through the hollow arm $F^3$ to the conduit E and cells $D'$ and $D^2$. When the member F is rocked into the position shown in full lines in Fig. 2, the sealing liquid $f$ permits atmospheric air to pass through the hollow arm $F^4$ and chamber $F^5$ into the hollow arm $F^3$, but prevents gas from then flowing into the chamber $F^5$ through the hollow arm $F^2$. Under certain conditions hereinafter described, the member F occupies an intermediate position shown in dotted lines in Fig. 2. In this intermediate position, the sealing liquid $f$ serves as it does in the full line position of Fig. 2 to prevent the chamber $F^5$ from receiving gas from the hollow arm $F^2$ while permitting air to flow from the arm $F^4$ through the chamber $F^5$ into the arm $F^3$.

As shown, a spring $F^6$ is provided to move the member F into the position shown in Fig. 2 whenever such movement is permitted by a controlling member H shown as a three-armed lever pivoted at $H'$. One arm of the member H is provided with a stud $H^2$ shown as engaging the arm $F^3$ of the member F and thereby preventing the member F from moving under the action of the spring $F^6$ except when the member H is permitted to turn in the counter-clockwise direction out of the position shown in Fig. 1.

The position of the member H is controlled by the engagement of a second arm $H^3$ of the member with rotating cams $C^2$ and $C^{20}$, which are shown as being driven by the timing device C. As shown the cam $C^2$ is formed with a peripheral notch comprising a low portion $C^3$ and an intermediate portion $C^4$ adapted to receive a tooth or projection $H^{30}$ carried by the arm $H^3$. The cam $C^{20}$, which rotates more slowly than the cam $C^2$, is shown as provided with three similar peripheral notches $C^{21}$ into which a tooth $H^{31}$ carried by the arm $H^3$ enters when the parts are in the position permitting such entrance. In a contemplated mode of operation of the apparatus shown in Fig. 1, the cam $C^{20}$ makes one revolution every twenty-four hours and the cam $C^2$ makes one revolution every fifteen minutes, but it will be understood, of course, that the time required for the rotation of each cam, and the number of cam notches in the cam $C^{20}$ may be varied as conditions make desirable.

Except when the positions of the cam notches permit the teeth $H^{30}$ and $H^{31}$ to enter those notches, the teeth bear against the peripheries of the corresponding cams in contact with which they are held by the spring $H^5$. As the cams turn into the proper positions, the tooth $H^{30}$ enters the deep portion $C^3$ of the notch in the cam $C^2$, and the tooth $H^{31}$ enters one of the notches $C^{21}$ of the cam $C^{20}$. The tilting movement thus permitted the member H moves the pin $H^2$ far enough to permit the gas switch F to turn from the position shown in Fig. 1 into that shown in Fig. 2. As the movements of the cams continue the tooth $H^{30}$ moves into the shallower portion $C^4$ of the cam $C^2$, and the member H is thereby rocked back into an intermediate position, shown in dotted lines in Fig. 2, in which the sealing liquid $f$ in the switch member F still prevents communication between the hollow arms $F^2$ and $F^3$ through the chamber $F^5$, and still permits the flow of air through the hollow arms $F^4$ and $F^3$ into the gas cells $D'$ and $D^2$.

The rocking movements of the member H are also employed to change circuit connections of the apparatus. To this end the arm $H^4$ of the member H is provided with switch contacts $h$, $h'$, and $h^2$, the contacts $h$, $h'$ and $h^2$ being insulated from one another. With the particular arrangement shown, when either one of the teeth $H^{30}$ and $H^{31}$ engages an unnotched peripheral portion of the corresponding cam, the contact parts $h'$ and $h^2$ are in engagement with corresponding stationary contacts $I'$ and $I^2$, respectively. With the tooth $H^{31}$ received in one of the notches $C^{21}$ of the cam $C^{20}$, and the tooth $H^{30}$ received in the deep portion $C^3$ of the notch in the cam $C^2$, the contacts $h'$ and $h^2$ engage stationary contacts $K'$ and $K^2$, respectively, and the contact $h$ then connects a pair of stationary contacts $M'$ and $M^2$. In the intermediate position of the arm $H^4$ in which the tooth $H^{30}$ is received in the shallow portion $C^4$ of the notch in the cam $C^2$, the contacts $h'$ and $h^2$ are in engagement with the stationary contacts $J'$ and $J^2$, respectively, and the contact $h$ connects the contacts $L'$ and $L^2$.

The movable contacts $h'$ and $h^2$ are permanently connected to the terminals 1 and 2 of the galvanometer winding. The stationary contacts $I'$ and $J'$ are each permanently connected by a conductor 3 to the bridge junction $W^2$, and the stationary contacts $I^2$ and $J^2$ are permanently connected by a conductor 4 to the opposing bridge junction W'.

The stationary contacts K' and K² are permanently connected by conductors 5 and 6 to the terminals of a resistance RT in the bridge energizing circuit, which is connected to the opposing junctions W³ and W⁴ of the bridge by a circuit portion including a variable resistance RU and a battery Z connected in series with the resistance RT. The bridge junction W³ is shown as formed by a contact member angularly adjustable along an arc-shaped resistance RS by the rotation of a reversible motor MS. The portion of the slide wire resistance RS at one side of the contact W³, in any adjustment of the latter, is in the arm of the bridge which includes the cell resistor RG, while the portion of slide wire resistance RS at the opposite side of the contact W³ is in the arm of the bridge including the cell resistor ra. The portion of the resistance RU in the bridge energizing circuit depends upon the position of a rheostat arm or contact U' which may be rotated in one direction or the other by a reversible motor MU.

The motors MS and MU are each energized from time to time to rotate in one direction or the other as conditions may then require, by connecting corresponding motor terminals of each motor to current supply conductors or mains 9 and 10. One terminal 13 of the motor MS is connected to the contact L', and when the member H is in the position in which the contact L' is engaged by the contact h, the terminal 13 of the motor MS is connected to the supply conductor 9 through the contacts h, L' and L², and conductor 8. With the terminal 13 thus energized, the motor MS will turn in one direction if its terminal 14 is then connected to the conductor 10, and will turn in the opposite direction if the terminal 15 is then connected to the conductor 10.

The terminal 14 of the motor MS is connected to a contact Q' which is normally disconnected from the conductor 10, but is momentarily connected to the latter through the superposed contact Q¹⁰, when the normally separated contacts Q' and Q¹⁰ are momentarily brought together by the action of the depressor B on the pointer A, while the latter is above contacts Q' and Q¹⁰. The terminal 15 of the motor MS is connected to a contact Q² which is normally disconnected from the conductor 10, but is temporarily connected to the latter through a contact Q²⁰ above the contact Q², by the action of the depressor B on the pointer A when the latter is above the contacts Q² and Q²⁰.

When the member H is in the position in which the contact h connects the stationary contacts M' and M², the terminal 7 of the motor MU is then connected to the supply conductor 9 through the contacts h, M' and M² and conductor 8. With the terminal 7 thus energized, the motor MU will turn in one direction if its terminal 11 is connected to the supply conductor 10, and will turn in the opposite direction if the terminal 12 is connected to the supply conductor 10.

The terminal 11 of the motor MU is connected to a contact P' which is connected to the conductor 10 only when a superposed contact P¹⁰ is depressed by the action of the depressor B on the pointer A when the latter is above the contacts P¹⁰ and P'. The terminal 12 of the motor MU is connected to a contact P² which is connected to the supply conductor 10 only when the depressor B acting through the pointer A moves the contact P²⁰ above the contact P² into engagement with the latter.

In the normal operating condition of the apparatus illustrated in Fig. 1, in which the contacts h' and h² are in engagement with the contacts I' and I², respectively, the galvanometer responds to the differences in potential between the bridge junctions W' and W². That potential differential, depends upon the relative thermal conductivities of the standard gas sealed in the cells D³ and D⁴ containing the resistors ra and RA, and of the test gas being passed through the cells D' and D² containing the resistors RG and rg and supplied to the latter from the test gas supply conduit G. As the thermal conductivity of the test gas increases and decreases with changes in the composition of that gas, the temperature of the resistors RG and rg accordingly decreases and increases. As the temperature of the resistors RG and rg increases and diminishes, the resistances of those resistors correspondingly increase and decrease and thereby cause the potential difference between the bridge junctions W' and W² to increase and decrease, and thus increase and decrease the deflection of the pointer A' from the zero position of the latter. It will be understood, of course, that the same general result would be obtained if one of the test gas resistors, for example the resistor rg, and one of the standard gas resistors, for instance the resistor ra, were each replaced by a suitable ratio resistance.

At suitable intervals, for example once every eight hours with the cam speeds hereinbefore mentioned by way of illustration, the cam C² and cam C²⁰ turn into the positions in which the tooth H³⁰ of the arm H³ enters the deep portion C³ of the cam C², while the tooth H³¹ enters one of the notches C²¹ of the cam C². When this occurs the member H swings from the position shown in Fig. 1 into the position shown in full lines in Fig. 2, thereby causing the movable switch contact h to connect the contacts K' and K², and thus connect the terminal 7 of the motor MU to the supply conductor 9, while the simultaneous engagement of the contacts $h'$ and $h^2$ with the contacts $K'$ and $K^2$, respectively, connects the galvanometer to the terminals of the resistance RT in the bridge energizing circuit.

If the current flow through the bridge energizing circuit is then at the proper value, the pointer $A'$ of the galvanometer A will swing into a predetermined position which is a position intermediate the contacts $P'$ and $P^{10}$ on the one hand, and the contacts $P^2$ and $P^{20}$ on the other hand. If, as a result of a falling off in the voltage of the battery Z, the pointer $A'$ does not then quite reach the predetermined position, on the downward movement of the depressor B the contacts $P^{20}$ and $P^2$ are brought into engagement. This connects the motor terminal 12 to the conductor 10, and the motor MU then operates in the direction to decrease the amount of resistance RU in the battery energizing circuit. If, for any reason, with the parts in the position shown in Fig. 2, the bridge energizing current is too high, the downward movement of the depressor B will cause the contact $P^{10}$ to be brought into engagement with the contact $P'$ whereupon the motor MU will operate to increase the amount of resistance RU in the bridge energizing circuit. Advantageously, the apparatus is so proportioned that the depressor B will engage the pointer $A'$ several times while the tooth $H^{30}$ is received in the deep portion $C^3$ of the cam $C^2$, and several additional times while the tooth is in the shallower portion $C^4$ of the cam $C^2$ to increase the accuracy of the calibrations.

When as a result of the continued rotation of the cam $C^2$, the tooth $H^{30}$ is moved into the shallower portion $C^4$ of the cam $C^2$ and the member H is thereby turned into its intermediate position, shown in dotted lines in Fig. 2, the switch contacts $h$, $h'$ and $h^2$ are moved to disconnect the terminals of the reversible motor MU from the switch contacts $P'$ and $P^2$, and to connect the reversible motor MS to the contacts $Q'$ and $Q^2$, and to again connect the terminals of the meter to the bridge junctions $W'$ and $W^2$. Since with the lever H in either position shown in Fig. 2, the supply of test gas to the cells $D'$ and $D^2$ is interrupted and those cells are then being supplied with air, the cells $D'$ and $D^2$ are swept clear of test gas, and the resistors RG and $rg$ have ample time to attain the proper temperature with air as the gas in the test cells, prior to the adjustment of the apparatus into the intermediate position illustrated in dotted lines in Fig. 2. In consequence, if the bridge is properly balanced, and if the meter, itself, is properly calibrated, the meter pointer $A'$ indicates zero on the meter scale when the member H is in the intermediate position. If, for any reason, the meter pointer does not then assume the zero position, the downward movements of the depressor will cause the contacts $Q'$ and $Q^{10}$, or the contacts $Q^2$ and $Q^{20}$, to engage and thereby start the motor MS into operation. The operation of the motor MS thus produced varies the relative portions of the slide wire resistance S in the two bridge arms including the resistors RG and $ra$ respectively, in a direction tending to bring the meter pointer to its zero position intermediate the two sets of contacts $Q'$ and $Q^{10}$, and $Q^2$ and $Q^{20}$. Advantageously, the contact $Q^{20}$ is provided with a finger $Q^{21}$ preventing the meter pointer $A'$ from swinging off the scale to the left as seen in Fig. 1. Advantageously, also, the contact $Q^{10}$ is elongated sufficiently to cover the maximum departure of the pointer to the high side of its zero point which is to be expected when the test gas cells contain standard gas.

The time controlled switch mechanism illustrated in the drawings is inherently simple and effective in character. The use of the two cams $C^2$ and $C^{20}$ to control the position of the member H possesses the practical advantage that the relatively high speed of the cam $C^2$ and consequent substantial arc of movement of that cam occurring during the calibration period facilities the formation of the cam with the proper contour to secure desirably rapid movements of the switch contacts $h$, $h'$ and $h^2$ from one to another of their different positions, while the slow moving cam $C^{20}$ prevents an undesirably short interval between successive actuations of the member H. With the rotative speeds given by way of illustration above the cam $C^{20}$ will prevent the tooth $H^3$ from entering the cam notch $C^3$, $C^4$ of the cam $C^2$ during thirty-one of every thirty-two successive revolutions of the cam $C^2$.

While in accordance with the provisions of the statutes, I have illustrated and described the best form of embodiment of my invention now known to me, it will be apparent to those skilled in the art that changes may be made in the form of the apparatus disclosed without departing from the spirit of my invention as set forth in the appended claims and that in some cases certain features of my invention may be used to advantage without a corresponding use of other features.

Having now described my invention, what I claim as new and desire to secure by Letters Patent, is:—

1. Gas comparison apparatus comprising in combination a cell containing a standard gas, a second cell, a metering system including a meter responsive to differences in physical characteristics of the gases contained in the two cells, means supplying test gas and standard gas to said second cell during alternate intervals, and means for effecting a compensatory calibration adjustment of said metering system in response to any deflection of the meter from a predetermined position occurring while standard gas is supplied to said second cell.

2. Gas comparison apparatus including a cell containing standard gas, a second cell normally containing a test gas, a metering system including a meter responsive to differences in physical characteristics of the gases contained in the two cells, periodically operating means for supplying standard gas for limited time intervals to said second cell, and means dependent upon the direction of displacement of the deflecting element of the meter from a predetermined position when said second cell is supplied with standard gas for effecting a calibrating adjustment in said system tending to neutralize said displacement.

3. Gas comparison apparatus including a cell containing a standard gas, a second cell, a gas switch adapted in one position to supply test gas to said cell and in a second position to supply standard gas to said cell, metering system comprising an energized measuring circuit including a resistor located in each of said cells and a meter connected to said circuit to respond to variations in relative resistance of said resistors, normally inoperative means through which said meter is adapted to effect calibrating adjustments in said system and mechanism for periodically adjusting said switch into its different positions, and for rendering said means operative while said switch is in its second position.

4. Gas comparison apparatus including a cell containing a standard gas, a second cell, a gas switch adapted in one position to supply test gas to said cell and in a second position to supply standard gas to said cell, a metering system comprising a measuring circuit including a resistor located in each of said cells, means including a source of current and an adjustable resistance for causing a current flow of regulated intensity through each resistor, a meter, and a circuit controller adapted in one position to connect said circuit and meter so that the latter is responsive to variations in relative resistance of said resistors and adapted in a second position to connect said circuit and meter so that the latter is responsive to any departure from a predetermined value of said current intensity, and time controlled mechanism for periodically adjusting said switch and controller each into its different positions, and means actuated by said meter, while the latter is so connected as to be responsive to said variations in current flow intensity, for adjusting said variable resistance to minimize such departure.

5. Gas comparison apparatus including two gas containing cells and a metering system comprising a measuring circuit including a resistor located in each of said cells and a source of current and an adjustable resistance for causing a current flow of regulated intensity through each resistor, a meter and a switch operative in one position to connect said circuit and meter so that the latter is responsive to variations in relative resistance of said resistors and adapted in a second position to connect said meter and circuit so that said meter is responsive to any departure from a normal value of said current intensity, switch controlling mechanism periodically adjusting said switch into said positions, and means actuated by said meter while said switch is in said second position for adjusting said variable resistance to minimize any such departure that may then exist.

6. Gas comparison apparatus including a cell containing a standard gas, a second cell normally containing a test gas, a metering system including a meter responsive to different physical characteristics of the gases contained in the two cells, a gas switch adapted when actuated to supply standard gas to said second cell and to cut off the supply of test gas thereto, a meter system calibration means including a relay motor, an electric switch mechanism adapted when actuated to subject said relay motor to the control of said meter, and a time mechanism for periodically actuating said switch and mechanism.

7. Gas comparison apparatus including a cell containing a standard gas, a second cell normally containing a test gas, a metering system including a meter responsive to differences in physical characteristics of the gases contained in the two cells and calibrating provisions for said system including a gas switch for supplying test gas or standard gas to said second cell, depending on the position of said switch, a pair of relays, a circuit controller adapted when in one position to make one of said relays subject to the control of said meter and when in a second position to make the second relay subject to the control of said meter and when in a third position to prevent either relay from being subject to said meter, and time controlled means for periodically adjusting said switch and controller into their different positions.

Signed at Philadelphia, in the county of Philadelphia, and State of Pennsylvania, this 23 day of May, A. D. 1927.

RICHARD P. BROWN.